United States Patent [19]

Auman et al.

[11] Patent Number: 5,202,412
[45] Date of Patent: Apr. 13, 1993

[54] POLYIMIDE COPOLYMER PRECURSORS

[75] Inventors: Brian C. Auman, Newark, Del.; John D. Summers, Newtown Square, Pa.

[73] Assignee: E. I. Du Pont de Nemours and Company, Wilmington, Del.

[21] Appl. No.: 591,225

[22] Filed: Oct. 2, 1990

[51] Int. Cl.$^5$ .................. C08L 79/08; C08G 69/26
[52] U.S. Cl. .................... 528/353; 525/432; 525/436
[58] Field of Search ............... 525/432, 436; 528/353

[56] References Cited

U.S. PATENT DOCUMENTS

| | | | |
|---|---|---|---|
| 3,621,076 | 11/1971 | De Winter et al. | 525/432 |
| 4,058,505 | 11/1977 | D'Alelio | 260/47 |
| 4,197,397 | 4/1980 | D'Alelio | 528/222 |
| 4,410,664 | 10/1983 | Lee | 525/180 |
| 5,077,382 | 12/1991 | Meterko et al. | 528/353 |

FOREIGN PATENT DOCUMENTS

| | | | |
|---|---|---|---|
| 59-179523 | 10/1984 | Japan | 73/10 |
| 59-232149 | 12/1984 | Japan . | |
| 3159433 | 7/1988 | Japan | 525/432 |
| 63-254131 | 10/1988 | Japan | 73/10 |
| 63-14242 | 12/1988 | Japan | 73/10 |
| 63-314241 | 12/1988 | Japan | 73/10 |

*Primary Examiner*—Ana L. Carrillo

[57] ABSTRACT

Soluble polymeric precursors having oligomeric imide and amic acid segments, which are suitable to form segmented, preferably insoluble, polyimide copolymers.

14 Claims, No Drawings

POLYIMIDE COPOLYMER PRECURSORS

1. FIELD OF THE INVENTION

This invention relates to soluble imide/amic acid containing precursors to segmented, preferably insoluble, polyimide copolymers; it also pertains to a method of making such precursors and their conversion to polyimide copolymers.

2. BACKGROUND OF THE INVENTION

Polyimides constitute a class of valuable polymers being characterized by thermal stability, inert character, usual insolubility in even strong solvents, and high Tg, among others. Their precursors are usually polyamic acids, which may take the final imidized form either by thermal or by chemical treatment.

Polyimides have always found a large number of applications requiring the aforementioned characteristics in numerous industries, and recently their applications have started increasing dramatically in electronic devices, especially as dielectrics. With continuously escalating sophistication in such devices, the demands on the properties and the property control are becoming rather vexatious.

Especially for the electronics industry, improvements of polyimides are needed in forming tough, pin-hole free coatings, having lower dielectric constant, lower coefficient of thermal expansion, lower moisture absorption, and decreased brittleness, among others. Although it is not usually possible to maximize all properties, since many of them may be antagonistic, optimization as a total is highly desirable and it may be achieved if adequate control on the properties becomes available through molecular architecture or other means.

Different aspects regarding polyimides and copolyimides may be found in a number of publications, such as for example:

Sroog, C. E., J. Polymer Sci.: Part C, No. 16 1191(1967).

Sroog, C. E., J. Polymer Sci.: Macromolecular Reviews, Vol. 11, 161 (1976).

Jensen, R. J. and Lai, J. H., "Polyimides: Chemistry, Processing, and Application for Microelectronics" in "Polymers for Electronic Applications", Lai, J. H., Ed., Ch. 2, p. 33 CRC Press, Boca Raton, Fla. (1989).

Soluble polyimides are described in the following references.

E. S. Moyer, D. K. Mohanty, C. A. Arnold, J. E. McGrath; "Synthesis and Characterization of Soluble Polyimide Homo- and Copolymers"; *Polymeric Materials; Science & Engineering Proceedings of ACS Division of Polymeric Materials;* V60; p. 202–205; Spring 1989.

M. E. Rodgers, C. A. Arnold, J. E. McGrath; "Soluble, Processable Polyimide Homopolymers and Copolymers"; Polymer Preprints, ACS Division of Polymer Chemistry; V30-1; p. 296; 1989.

Y. Oishi, M. Xie, M. Kakimuto, Yoshio; "Synthesis and Characterization of Soluble Arumatic Polyamides and Polyimides from 1,1-(Bis(4-Aminophenyl)-2,2-diphenylethylene"; *Polymeric Materials; Science & Engineering Proceedings of ACS Division of Polymeric Materials;* V60; p. 757–761; Spring 1989.

F. W. Harris, Y. Sakaguchi; "Soluble Aromatic Polyimides Derived from New Phenylated Diamines"; *Polymeric Materials; Science & Engineering Proceedings of ACS Division of Polymeric Materials;* V60; p. 187–192; Spring 1989.

One of the problems with soluble polyimides is that in order to achieve solubility, other properties conventionally are sacrificed, such as for example solvent resistance, thermooxidative stability, and the like.

It has been long known that the properties of a polymer may be best controlled and diversified by using segmented or block copolymers (the words "block" and "segment" regarding copolymers are used in this discussion as synonyms), wherein each of the segments or blocks provides a special and desirable character or property. A classic example is that of the styrene/butadiene block copolymers, wherein the styrene blocks provide stiffness and the butadiene blocks provide elasticity, stiffness and elasticity being two major components of toughness. The desired mechanical properties realized by block polymerization of the above segments cannot be received by random polymerization, despite the fact that the empirical formula, molecular weight, and other parameters may be kept constant in both cases.

Thus, a large number of attempts have been made to duplicate this concept in the case of polyimides, in order to control their properties to better fit the requirements of a given specific application. However, all these attempts have been either partially or totally unsuccessful, due to certain factors, which are more or less unique to conventional polyimide structure and chemistry, especially when combined with the two major contributing facts, among others, as explained hereinafter.

First, polyimides are valuable because they are normally insoluble, as already mentioned. Therefore, they also possess high solvent resistance. However, this beneficial property itself becomes a heavy burden regarding the way to apply a highly insoluble polyimide in the form of a coating, for example. Thus, the most common technique of applying polyimides as coatings is to use a solution of the respective polyamic acid, which is considerably more soluble, and then after the application, convert the polyamic acid to the corresponding imide by either heat or chemical means. An alternate way, also useful in the preparation of segmented polyimides, is to employ soluble oligomers, which have functional terminal groups, such as for example isocyanates, epoxides, ethylenically unsaturated groups, and the like, and then extend them or crosslink them. These functional groups, however, are source of decreased thermooxidative stability, and they may cause in general deterioration of polymer properties.

Second, a special characteristic of poly(amic acids), which are for all practical purposes the reaction products of carboxylic acid dianhydrides with diamines, is that they are perpetually in a status of dynamic equilibrium, in a way that their components (diamines and dianhydrides) continuously interchange positions, depending on the factors which drive said equilibrium, in contrast with polyimides, which typically do not undergo such changes. Poly(amic acid) equilibration is further detailed by C. C. Walker, "J. Polym. Sci.; PART A: Polym. Chem. Ed.", 26, 1649 (1988). Reequilibration of binary poly(amic acid) mixtures is discussed by M. Ree, D. Y. Yoon, W. Volksen; "Miscibility Behavior and Reequilibration of Binary Poly(Amic Acid) Mixtures"; *Polymeric Materials; Science & Engineering Proceedings of ACS Division of Polymeric Materials;* V60; p.179–182; Spring 1989. On the other hand, equilibration in the case of aromatic polyimides requires stringent conditions, such as for example described by Takekoshi, T., "Synthesis of Polyetherimides by Transimidization Reaction", preprints of symposium on Recent Advances in Polyimides and Other High Performance Polymers, Div. of Polymer Chemistry, Am. Chem. Soc., San Diego, Calif., Jan. 1990.

One way to retard the dynamic equilibration in the case of polyamic acids is to cap the end-groups, for example with reactive groups, as aforementioned in the case of oligoimides. However, the same disadvantages are here also present. An alternate way is to start with an oligomeric amic acid ester, which unlike the amic acid does not substantially undergo interactive interchange.

A functionally terminated oligomeric acid ester can be reacted with diamine moieties in the presence of condensing agents or through the carbonyl chloride adduct of the esterified oligoamide. Some of these methods give low molecular weight polymers, and therefore, downgraded properties, while other methods are very cumbersome, and their by-products have the potential of being corrosive, a fact which is entirely unacceptable in the Electronics Industry. A summary af such methods is given by W. Volkso in "Symposium on Recent Advances in Polyimides and other High Performance Polymers", by the Division of Polymer Chemistry of the American Chemical Society, San Diego, Calif., Jan. 2214 25, 1990, page C1.

These important facts, among others, make the control of the structure of segmented polyimides particularly difficult.

Japanese Patent Publication 63-314241, published on Dec. 22, 1988, describes a method of production of polyacid amide copolymers in which an aromatic diamine is allowed to react with an aromatic tetracarboxylic acid dianhydride to form an acid amide prepolymer. A second aromatic diamine is then added to the solution of the prepolymer, a well as an additional aromatic tetracarboxylic acid anhydride, and the mixture is allowed to react.

Japanese Patent Publication 63-314242, Kamai et al., published Dec. 22, 1988, describes a method of producing a polyimide copolymer film by imidizing a polyamic acid copolymer film, by either heating or chemically treating the polyamic acid copolymer film.

Japanese Patent Publication 63-254131, Mitsubishi Denki KK, issued 10/4/87, describes production of an aromatic polyimide having good molding properties by reacting p-phenylenediamine with pyromellitic acid derivative, and then with aromatic diamine and aromatic tetracarboxylic acid derivative.

Japanese Patent Publication 59-179523, Agency of Ind Sci Tech, issued 31/03/83, describes a thermosetting heat-resistant resin made by heating an imide compound having unsaturated end-groups with an aromatic amine, and optionally with an aromatic tetracarboxylic acid (or reactive derivative).

Japanese Patent Publication 59-232149, describes a composition, which is obtained by incorporating a salt of polycarboxylic acid and polyamine in a polyimide polymer or a polyamide polymer U.S. Pat. No. 4,410,664, Lee, issued 10/18/83, describes the preparation of a polyimide-epoxy thermoset resin carried out by reacting a polyepoxide with a polyimide dianhydride together with a polyimide dianhydride and/or polyimide diamine, wherein at least one of the polyimide components is insoluble in the solvent in the absence of the other polyimide components.

U.S. Pat. No. 4,197,397, D'Alelio, issued 4/8/80, describes aromatic polyimides with anhydride end groups, chain extended (molecular weight increased) by reacting them with aromatic diamines or diamine terminated imide oligomers. The reaction can either be at a temperature above the melting point of the reactants or in solvents of the reactants. These polyimides can be shaped and formed prior to chain extending.

U S. Pat. No. 4,058,505, D'Alelio, issued 11/15/77 describes an aromatic polyimide with amine end groups, chain-extended (molecular weight increased) by reacting them with aromatic di- or tri- anhydrides. The reaction can either be at a temperature above the melting point of the reactants or in solvents for the reactants. The polyimides can be shaped and formed prior to chain-extending.

In contrast to other unsuccessful attempts, the present invention combines appropriate advantages from both polyimide and polyamic acid chemistries in order to provide highly improved soluble precursors of eventually segmented, preferably insoluble, polyimide copolymers.

3. SUMMARY OF THE INVENTION

The present invention is directed to a polyimide copolymer precursor soluble in a polar solvent comprising a first segment and a second segment connected through an amide or imide group having a carbon-nitrogen bond; wherein
a) the first segment is formed from a first amic acid which is a reaction product of a first diamine and a first dianhydride resulting in an acid having two identical terminal portions selected from the group consisting of amine and acid anhydride and wherein the acid is imidized to a degree to substantially prevent amine and anhydride rearrangement
  (1) within the first segment, and
  (2) between the first segment and the second segment, and
(b) and the second segment is formed from a second amic acid which is a reaction product of a second diamine and a second dianhydride.

It is also directed to a method of making a polyimide copolymer precursor containing a first segment and a second segment, comprising the steps of:
(a) reacting a first acid dianhydride with a first diamine in a ratio to obtain a first amic acid segment having two identical terminal portions selected from the group consisting of acid anhydride and amine;
(b) imidizing the first amic acid segment to form the first segment which imidization is to a degree which substantially prevents amine and anhydride rearrangement
  (1) within the first segment, and
  (2) between the first and the second segment; and
(c) reacting the first segment with a second acid dianhydride and a second diamine to form a second segment attached to the first segment through an amide group having a carbon-nitrogen bond.

In addition, the present invention pertains to a method of making a polyimide copolymer having a first imide segment and a second imide segment, comprising the steps of:
(a) reacting a first acid dianhydride with a first diamine in such molecular ratio to obtain a first amic acid segment having two identical terminal portions selected from the group consisting of acid anhydride and amine;

(b) imidizing the first amic acid segment to form the first imide segment which imidization is to a degree which substantially prevents amine and anhydride rearrangement
  (1) within the first imide segment, and
  (2) between the first imide and a second amic acid segment; and (c) reacting the first imide segment with a second acid dianhydride and a second diamine to form a second amic acid segment attached to the first imide segment through an amide group having a carbon-nitrogen bond, (d) imidizing the second amic acid segment to form the second imide segment of the polyimide copolymer.

Finally, the present invention also pertains to a polyimide copolymer having a first imide segment and a second imide segment made according to a method as defined immediately above.

4. DETAILED DESCRIPTION OF THE INVENTION

The present invention is directed to soluble precursors to polyimide copolymers, which are preferably insoluble, as well as methods of preparing the same.

According to a preferred embodiment of the present invention, a first carboxylic acid dianhydride is reacted with a diamine to form a first amic acid segment in a oligomeric form. The molar amounts of the two components, the first diamine and the first acid are selected such that the first amic acid segment will be terminated at both ends with either amine or groups, and it will possess a predetermined molecular weight.

Dry starting materials, as well as dry conditions during preparation, are followed. The preferable temperature during this stage of preparing the first amic acid depends on the reactivity of the components. The higher the reactivity the lower the preferred temperature, and the lower the reactivity the higher the preferred temperature, in order to avoid excessively long reaction times. The selected temperature should be lower than a critical temperature at which apprreciable imidization may occur before complete amidization, since water resulting from the imidization process may open a respective amount of anhydride to give the corresponding acid, which in turn will give rather salt with the amine than an amide, thus having a detrimental effect on oligomerization. Usually, temperatures lower than 100° C. are adequate for the reaction to occur and equilibrium to be reached in reasonable periods of time. A preferable range of temperatures is 10° and 70° C.

When the reaction towards the first amic acid segment is complete, the temperature is raised for the imidization reaction to take place. Preferably, temperatures between 150° and 250° C., and more preferably between 160° and 200° be utilized. In any case, the temperature should be kept at low enough level, so that no appreciable evaporation of solvent takes place. At the same time, the temperature should be high enough to facilitate water removal. Removal of water may also be facilitated by the incorporation of azeotropic solvents, such as for example toluene, or solvents in which water is insoluble under certain conditions, such as for example N-cyclohexyl-2-pyrrolidone. Regardless of the mechanism involved, a solvent or mixture of solvents, which facilitate the removal of water and are compatible with the system are useful for the practice of this invention.

The product of imidization is a first imide segment terminated at both ends with either amine or acid anhydride groups. This type of termination of groups of the same kind is important to control the molecular weight and the equilibrium of the present species. Simultaneous presence of both amine and anhydride end groups in the composition is susceptible to reaction, until ultimate separation by either distance or rigidity or high viscosity, or the like takes over.

The first imide segment should have a molecular weight (all molecular weights in this discussion are number average molecular weights) of at least 500, preferably higher than 2,000 and more preferably higher than 3,000. The upper limit is usually dictated by the desired design of the final copolymer, as well as by the requirement that this segment has to be part of a soluble precursor. Evidently, the longer the average molecular weight the less soluble this segment. If precipitated, it becomes excessively difficult to redissolve. Also, if the molecular weight is too large, the resulting high viscosity of the solution may render mixing and processing very difficult.

Subsequently, the first imide segment is reacted with an appropriate mixture of a second diamine and a second acid dianhydride to form a soluble segmented polymer. The second segment, a product of reaction of the diamine with the acid dianhydride, represents amic acid segment. The reaction conditions depend on the reactivities of the components, the diamine and the dianhydride, but in general they follow the same rules as the ones aforementioned regarding the first amic acid segment. The average molecular weight of the second segment of amic acid may be usually considerably larger than the molecular weight of the first amic acid which is imidized to form the first segment since such first segment according to this invention assumes the imide form while the polymeric molecule is still in solution, while the second segment imidizes only during curing of the precursor, combined with the fact that polyimides are usually considerably less soluble than polyamic acids. The upper limit of the molecular weight of the second segment of amic acid will usually be dictated by the excessive viscosity of the solution.

Although component (diamine and dianhydride) rearrangement within the second segment takes usually place continuously, substantially no rearrangement takes place within the components of the first segment or between the components of the first and the second segments. This is due to the fact that the reaction towards imidization of the first segment of amic acid is allowed to progress adequately to substantially prevent such rearrangement. Thus, the resulting polymer, i.e., precursor to polyimide copolymer is unsubstitutable. The word "unsubstitutable" in this discussion means that no significant rearrangement (i.e., substantially no rearrangement), exchange or substitution may take place within the components of the first segment or between the components of the first and the second segments, i.e., no amine or anhydride rearrangement takes place. Thus, the resulting polyimide copolymer, after imidizing the entire polymer, if so desired, is also an unsubstitutable co-polymer for similar reasons.

The unsubstitutable soluble segmented precursor to a copolyimide polymer may also be characterized as a net polymer. The word "net" in this discussion signifies esoteric purity in the respect that all segments and components of the precursor are connected with bonds of the same nature, that is through amide or imide groups, which of course have a carbon-nitrogen bond. The word "net" is not used to indicate purity with regard to absence of solvent or other similar adjuncts, which are foreign to the structure of the polymer. The esoteric purity preserves the thermo-oxidative stability of the precursor. It also avoids unnecessary non-uniformities introduced by foreign groups to polyimide chemistry, such as for example isocyanates, epoxides, and the like, which have been previously disclosed.

The molecular weight of the soluble polymer should preferably be higher than 10,000, more preferably between 20,000 and 60,000, and even more preferably between 20,000 and 40,000. When the molecular weight is considerably lower than 10,000, the structural strength of any item, coating, or free film made by final imidization of the soluble polymer is minimal, while if the molecular weight exceeds 60,000 by far, viscosity problems are encountered.

It is also preferable in most occasions to use raw materials for both segments of rather higher than lower reactivity, if there is a choice, since both the molecular weight control and polydispersity tend to improve.

When the first segment, i.e., an imide segment, (before the subsequent reaction with the second diamine and second dianhydride) has terminal groups corresponding to an acid anhydride, the resulting amide or imide group having a carbon-nitrogen bond and connecting the two segments will be oriented in a way that the carbon is part of the first imide segment and the nitrogen is part of the second segment of amic acid. Similarly, when the first imide segment (before the subsequent reaction with the second diamine and second dianhydride) has a terminal group corresponding to a diamine, the resulting amide or imide group having a carbon-nitrogen bond and connecting the two segments will be oriented in a way that the nitrogen is part of the first imide segment and the carbon is part of the second segment of amic acid. This is mainly important before and during the preparation of the polymer rather than after its preparation. Solubility, reactivity, and storage considerations may play an important role in deciding the type of terminal group to employ.

The two segments, after the second segment has also been imidized may be the same or different. The utility of a polymer having the same segments derives from the fact that part of the imidization process has already taken place, and therefore less water will be evolved during final imidization as compared to a respective polymer precursor containing exclusively an amic acid segment. This becomes important, especially in thick structures, since liberation of excessive amounts of water may cause bubbling, delamination, pin-holes, and other imperfections. However, for the purposes of this invention, it is preferable that the first imide segment is different than the second segment of amic acid, after such second segment has also been imidized, so that the combination will give an overall improvement in the desired properties.

Thus, it is highly preferable that the two segments provide complementary functions. Such functions may be exemplified by often antagonistic properties, such as low water absorption, low dielectric constant, high toughness, high flexibility, high modulus, good solubility before terminal imidization and high insolubility after terminal imidization, low coefficient of thermal expansion (CTE), or generally well-matching CTE to the CTE of the substrate, among others, and the like. In the selection of the segments, one is chosen to provide predominantly at least one of such desired functions or properties, and the other segment is chosen to provide predominantly at least one other desired function or property. These functions or properties, imparted to the final copolyimide (otherwise called polyimide copolymer) after terminal imidization, are considered to be complementary since they have been chosen to complement each other. For example, the first segment might be chosen to give low water absorption and/or low dielectric constant, and or flexibility, and/or the like, and the second segment might be chosen to give low thermal expansion coefficient and /or high stiffness, and/or high strength, and/or the like, or any combination thereof.

This invention is particularly useful in combining segments, which as blended homopolyimides would have been incompatible with each other, thus giving to the final product unique properties, which cannot be achieved otherwise.

Other approaches having been proposed in the past, where for example, two polyimides terminating either in amine or anhydride end groups are connected through monomeric dianhydrides or amines, respectively, are not effective for a number of reasons. The most important reason is that both segments are polyimides, which by nature tend to be insoluble at rather low molecular weights. Also, different polyimides are not normally miscible with respect to each other. Therefore, they do not react efficiently with each other to form an adequately high molecular weight segmented copolymer. By combining such potentially insoluble imide entities through single diamines or single dianhydrides, the final molecular weight is severely limited in order to maintain the respective precursor soluble. This limitation in turn tends to deteriorate the properties of the final polyimide copolymer. Similar considerations apply also to combination of imide segments through foreign groups, such epoxides, isocyanates, and the like, in addition to other detrimental factors already discussed.

It is evident that one single segment, when extended via monomeric units results in a polymer having similar properties to those of a homopolymer made from the components (dianhydrides and diamines) of the single segment.

Finally, at the other end of the spectrum, precursors have been proposed having both segments in the form of amic acids. Although the solubility of the resulting precursors may be very good, rearrangement and exchange of components (diamines and dianhydrides) between the segments is inevitable even if strict precautions are taken. This behavior tends to destroy the expected benefits, and only with very strict, careful, and cumbersome precautions, the results may turn to be acceptable. Thus, only the compositions and techniques of the present invention have been found to present an overall satisfactory solution to this vexing problem.

The net unsubstitutable soluble segmented precursor described hereinabove may serve, as implied before, as an intermediate to a net unsubstitutable segmented, preferably insoluble, polyimide copolymer. Thermal or chemical means may be used for this transformation. However, thermal means present the preferred way for this second step of imidization. The precursor polymer may be applied as a coating from a solvent or in a bulk form. Depending on the application, the composition of the particular precursor, the dimensions and especially the thickness of the applied precursor, the ultimate properties, and the like, a suitable temperature profile may be determined by a person of ordinary skill in the art to achieve optimal results in the imidization process. This temperature profile may be as simple as one obtained by just placing the item in a conventional convection oven, set at a certain temperature, or a more complicated time/temperature profile may be employed. Temperatures used for imidization are usually between 150° to 500° C., preferably between 200° and 450° C., and more preferably between 250° and 400° C. The final polyimide copolymer is useful in the same manner as other polyimide copolymers well known in the prior art, e.g., as insulating material such as in the form of a film.

Examples of preferred diamines useful in the practice of this invention are 4,4'-diaminodiphenylether, 3,3'-dimethyl-4,4'-diaminobiphenyl, 3,3'-dimethoxy-4,4'-diaminobiphenyl, 4,4'-diaminoparaterphenyl, 4,4'-bis(4-aminophenoxy)-biphenyl, 4,4'-diaminodiphenylsulfone, 3,3'-diaminodiphenylsulfone, bis[4-(4-aminophenoxy)phenyl]sulfone, bis[4-(3 aminophenoxy)phenyl] sulfone, bis[2-aminophenoxy)phenyl]sulfone, 1,4-bis(4-aminophenoxy)benzene, 2,2'-dichloro-4,4'-diamino-5,5'-dimethoxy biphenyl, 2,2'-5,5'-tetrachloro benzidine, 9,10-bis(4-aminophenyl) anthracene, o-tolidine sulfone, 1,3-bis(4-aminophenoxy)benzene, 1,3-bis(3-aminophenoxy)-benzene, 1,4-bis(4-aminophenyl)benzene, bis[4-(aminophenoxy)phenyl]ether, 4,4'-diaminodiphenylmethane, bis(3-ethyl-4-aminophenyl)-methane, bis(3-methyl-4-aminophenyl)-methane, bis(3-chloro-4-aminophenyl)methane, 2,2'5,5'-tetrachloro-4,4'-diaminobiphenyl, 4,4'-diaminodiphenylsulfide, 3,3'-diaminodiphenyl ether, 3,4'-diaminodiphenyl ether, 4,4'-diaminodiphenylmethane, 4,4'-diaminooctafluorobiphenyl, meta-phenylenediamine, 2,2-bis[4-aminophenoxy)phenyl]-propane, 2,2-bis[4-(4-aminophenoxy)phenyl]hexafluoropropane, 2,2-bis(4-aminophenyl)propane, 2,2-bis(4 aminophenyl) hexafluoropropane, 2,2-bis(3-hydroxy-4-aminophenyl)propane, 2,2-bis(3-hydroxy-4-aminophenyl)hexafluoropropane, 9,9-bis(4-aminophenyl)-10-hydroanthracene, orthotolydinesulfone, b 3,3', 4.4'-biphenyltetramine, 3,3',4,4'-tetraminodiphenyl ether, diaminoanthraquinone, 1,5-diaminoanthraquinone, bis[4-(4-aminophenoxy)phenyl]sulfone, bis[4-(3-aminophenoxy)phenyl[sulfone, bis[4-(2-aminophenoxy)phenyl]sulfone, 3,3'-dichloro-4,4'-diaminobiphenyl, 3,3'-dihydroxy-4,4'-diamino biphenyl, 4,4'-diaminobiphenyl, 9,9-Bis(4-aminophenyl)fluorene, 4,4'-dimethyl-3,3'-diaminodiphenyl sulfone, 3,4'-Bisaniline-A, Bisaniline M, Bisaniline P, methylene-bis-2,6-xylidine, 4-diamino cumene, 2,5-dichloro p-phenylene diamine, 2,6-dichloro p-phenylene diamine, 2,5-dimethyl p-phenylene diamine, 2-chloro-p-phenylene diamine, 4-chloro m-phenylene diamine, 5-chloro-2-methyl-p-phenylene diamine, Acetoguanamine, 2,3,5,6-tetramethyl-p-phenylene diamine, 2,4,6-trimethyl-m-phenylene diamine, bis-3-aminopropyl-tetramethyldisiloxane, 2,7-diaminofluorene, 2,5-diaminopyridine, p-phenylenediamine,1,2-bis(anilino)ethane, diaminobenzanilide, diaminobenzoate, 1,5-diaminonaphthalene, diaminotoluene, diaminobenzotrifluoride, diaminoanthraquinone, 1,3-bis(anilino)hexafluoropropane, 1,4-bis-(anilino)octafluorobutane, 1,5-bis(anilino)decafluoropentane, 1,7-bis(anilino)tetradecafluoroheptane, 2,2-bis[4-(3-aminophenoxy)phenyl]hexafluoropropane, 2,2-bis[4-(2-aminophenoxy)phenyl]hexafluoropropane, 2,2-bis[4-(4-aminophenoxy)-3,5-dimethylphenyl]hexafluoropropane, 2,2-bis[4-(4-aminophenoxy)-3,5-ditrifluoromethyl-phenyl]hexafluoropropane, p-bis(4-amino-2-trifluoromethylphenoxy)benzene, 4,4'-bis(4-amino-2-trifluoromethylphenoxy)biphenyl, 4,4'-bis(4-amino-3-trifluoromethylphenoxy)biphenyl, 4,4'-bis(4-amino-2-trifluoromethylphenoxy)diphenyl sulfone, 4,4'-bis(3-amino-5-trifluoromethylphenoxy)diphenyl sulfone, 2,2-bis[4-(4-amino-3-trifluoromethylphenoxy)-phenyl]-hexafluoropropane, 3,3',5,5'-tetramethylbenzidine, 3,3'-dimethoxybenzidine, o-tolidine, m-tolidine, 2,2',5,5',6,6'-hexafluorotolidine, and 4,4'''-diaminoquaterphenyl, and mixtures thereof.

Examples of useful dianhydrides in the practice of this invention are pyromellitic dianhydride, 3,3',4,4'-biphenyl tetracarboxylic dianhydride, 3,3',4,4'-benzophenone tetracarboxylic dianhydride, 3,3',4,4'-diphenylsulfone tetracarboxylic dianhydride, 3,3',4,4'-diphenylether tetracarboxylic dianhydride, 3,3',4,4'-diphenylmethane tetracarboxylic dianhydride, 2,3,3',4'-biphenyl tetracarboxylic dianhydride, 2,3,3',4'-diphenylether tetracarboxylic dianhydride, 2,3,3',4'-benzophenone tetracarboxylic dianhydride, 2,3,6,7-naphthalene tetracarboxylic dianhydride, 1,4,5,7-naphthalene tetracarboxylic dianhydride, 1,2,5,6-naphthalene tetracarboxylic dianhydride, 2,2-bis(3,4-dicarboxyphenyl)propane dianhydride 2,2-bis(3,4-dicarboxyphenyl)hexafluoropropane dianhydride, 4,4'-bis(3,4-dicarboxyphenyl)diphenyl sulfide dianhydride, 1,3 diphenyl hexafluoropropane-3,3,4,4 tetracarboxylic dianhydride, 1,4,5,6-naphthalenetetracarboxylic dianhydride, 2,2',3,3'-diphenyl tetracarboxylic dianhydride, 3,4,9,10perylene tetracarboxylic dianhydride, bis(3,4-dicarboxyphenyl) ether dianhydride, naphthalene-1,2,4,5-tetra-carboxylic dianhydride, naphthalene-1,4,5,8-tetracarboxylic dianhydride, decahydronaphthalene-1,4,5,8-tetracarboxylic dianhydride, 4,8-dimethyl-1,2,3,5,6,7-hexahydronaphthalene-1,2,5,6-tetracarboxylic dianhydride, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-1,4,5,8-tetracarboxylic dianhydride, phenanthrene-1,8,9,10-tetracarboxylic dianhydride, cyclopentane-1,2,3,4-tetracarboxylic dianhydride, pyrrolidine-2,3,4,5-tetracarboxylic dianhydride, pyrazine-2,3,5,6-tetracarboxylic dianhydride, 2,2-bis(2,3-dicarboxyphenyl) propane dianhydride, 1,1-bis(2,3-dicarboxyphenyl) ethane dianhydride, 1,1-bis(3,4-dicarboxyphenyl) ethane dianhydride, bis(2,3-dicarboxyphenyl) methane dianhydride, and benzene 1,2,3,4-tetracarboxylic dianhydride, their derivatives, as well as mixtures thereof.

Examples of preferred solvents in the preparation of the compositions of the present invention are polar organic solvents, such as sulfoxide type solvents including dimethylsulfoxide, diethylsulfoxide, and the like, formamide type solvents including N,N-dimethylformamide, N,N-diethylformamide, and the like, acetamide type solvents including N,N-dimethylacetamide, N,N-diethylacetamide, and the like, pyrrolidone type solvents including N-methyl-2-pyrrolidone, N-cyclohexyl, 2-pyrrolidone, 1,3-dimethyl-2-imidozolidione, N-vinyl-2-pyrrolidone, and the like, phenolic solvents including phenol, o-, m-, p-cresol, xylenol, halogenated phenol, catechol, and the like, hexamethylphosphoramide, and a number of lactones including 7-butyrolactones. These solvents may be used alone or as a mixture. Partial use of aromatic hydrocarbons such as xylene, toluene, and the like, is also possible. The concentration of the copolymer in these polar organic solvents is preferably in a range of 5–40 wt %, and more preferably 10–30 wt % for better handling. Mixtures of solvents comprising N-methyl-2-pyrrolidone, and/or N-cyclohexyl-2-pyrrolidone are of preference.

As aforementioned, it is preferable to use pairs of diamines and dianhydrides in the composition of the present invention, which impart low Coefficient of Thermal Expansion (CTE) to the final polyimide. Examples of such pairs which give CTE values of less than 20 PPM in the range 50° to 250° C. at 5° C./min, are disclosed by Numata and Kinjo, Polym. Eng and Sci. V. 28, No. 14, p. 906 Jul. 1988:

| Diamine | Dianhydride |
| --- | --- |
| p-phenylene diamine (PPD) | 3,3,4,4'-biphenyl tetracarboxylic dianhydride (BPDA) |
| 2,5 diaminotoluene | pyromellitic dianhydride or BPDA |
| Diaminodurene | PMDA |
| 4,4'-benzidine | PMDA or BPDA |
| o-tolidine | PMDA or BPDA or BTDA |
| 3,3'-dimethoxybenzidine | PMDA |
| 4,4''-diaminoterphenyl | PMDA or BPDA or BTDA |
| 1,5-diaminonaphthalene | BPDA |
| 2,7-diaminofluorene | PMDA or BPDA or BTDA |
| 2,5-diaminopyridine | BPDA |

In general, pairing of monomers that tend to form a rigid, linear, extended chain structure, for example, dianhydrides like PMDA or BPDA, and the like, and diamines like PPD, substituted PPD, benzidine, substituted benzidines, 4,4''-diaminoterphenyl, 4,4'''-diaminoquaterphenyl, 2,5-diaminopyridine, 2,7-diaminofluorene, and 1,5-diaminonapthalene, etc. and the like, tend to give low thermal expansion when the extended chains are oriented in the direction of measurement. Pairing or use of monomers that tend to give a coil-like polymer structure, i.e., those containing flexible linkages or rigid kinks), for example, dianhydrides like BTDA, 6FDTA, ODPA, DSDA and the like, and diamines like 4,4'-oxydianiline, MPD (m-phenylene diamine), MDA (methylene dianiline), and the like, tend to give higher thermal expansion. The above lists of monomers are not meant to be exhaustive but are intended to give an idea of the type of structures that can affect thermal expansion properties.

GLOSSARY

APB-133: 1,3-bis(3-aminophenoxy) benzene
BPDA: 3,3',4,4'-biphenyl tetrcarboxylic dianhydride
-b-: Block
CHP: N-cyclohexyl-2-pyrrolidone
CTE: Coefficient of Thermal Expansion
DMAC: N,N -dimethylacetamide
DSDA: 3,3',4,4'-diphenylsulfone tetracarboxylic dianhydride
DSC: Differential Scanning Calorimetry
6FDA: 2,2'-bis(3,4-dicarboxyphenyl)hexafluoropropane
g: gram
GPa: Gigapascals
g/m: grams per molecule
GPC: Gas Permeation Chromatography
Mn: Number average molecular weight
MPa: Megapascals
NMP: N-methyl 2-pyrrolidone
4,4'-ODA: 4,4'-diaminodiphenyl ether
ODPA: Oxy-diphthalic anhydride
PMDA: Pyromellitic dianhydride
PPD: p-Phenylene Diamine
Tg: Glass Transition Temperature To illustrate the present invention, the following examples are provided. All parts are given by weight, and degrees are in centigrade unless otherwise indicated.

EXAMPLE 1

Preparation of 6FDA/4,4'-ODA difunctional polyimide oligomer

A dry 4 neck 250 round bottom flask was fitted with a Nitrogen inlet, Dean Stark trap, condenser, overhead stirrer assembly, thermocouple and heat source. The 6FDA (14.808 g, 0.0333 moles) was added to the flask and dissolved in 56 g NMP/CHP solution and heated to approximately 45° C. The ODA (5.74 g, 0.0287 moles) was dissolved in 24 g NMP/CHP and added rapidly to the stirring dianhydride solution. The reaction was allowed to proceed at 45° C. for 1 hour, and then heated to 180° C. to imidize the amic acid oligomer. The temperature was maintained at 180° C. for approximately 3 hours.

A portion of the anhydride terminated imide oligomer solution was poured into excess distilled water to isolate the oligomer. Potentiometric titration of the oligomer with base yielded a Mn of 4800 g/m (theoretical Mn was 4,100 g/m). GPC revealed a unimodal distribution centered around 12,000 g/m (vs. polystyrene standards).

EXAMPLE 2

Preparation of 6FDA/4,4'-ODA-b-PMDA/4,4'-ODA segmented polymer (50 wt. % 6FDA/4,4'-ODA)

The oligomer solution prepared in Example 1 was cooled to room temperature and 36 g, (0.0017 moles polyimide) of the solution was transferred to a 3 neck 250 round bottom flask using a Teflon ® tube and Nitrogen pressure.

The flask was fitted with an overhead stirrer assembly and a Nitrogen inlet. The soluble difunctional imide oligomer was chain extended by adding 3,2400 g 4,4'-ODA (0.0162 moles), 3.16 g PMDA (0.0145 moles) and 25 ml dry DMAC to the transferred reaction solution. After stirring for a short time the reaction solution became very thick and after 2 hours reaction time was diluted to approximately 15% solids with DMAC. A GPC trace of the segmented polymer indicated the material had a unimodal distribution with an Mn of 41,000 g/m (vs. polystyrene). Films cast from the solution and thermally imidized were clear and creasable. A reproducible glass transition temperature corresponding to the 6FDA/4,4'-ODA block was detected at 310° C.

EXAMPLE 3

Preparation of 6FDA/APB-133 anhydride terminated imide oligomer

A dry 4-neck 250 round bottom flask was fitted with a Nitrogen inlet, Dean Stark trap, condenser, overhead stirrer assembly, thermocouple and heat source. The 6FDA (8.8850 g, 0.02 moles) was added to the flask and dissolved in 40 g NMP under mild heat (45° C.). The APB-133 (5.4317 g, 0.0186 moles) was dissolved in 17.5 g NMP and 11.5 g CHP and added rapidly to the stirring dianhydride solution. The reaction was allowed to proceed at this temperature for one hour and then heated to 180 C. for 3 hours to imidize the amic acid oligomer. The solution was then allowed to cool to room temperature.

EXAMPLE 4

Preparation of 6FDA/APB-133-b-BPDA/4,4'-ODA segmented polymer (50 wt. % 6FDA/APB-133)

A portion of the solution prepared in Example 3 (18.2 g, 0.000315 moles imide oligomer) was transferred to a three neck 250 round bottom flask. The flask was fitted with an overhead stirrer assembly and a Nitrogen inlet. The soluble difunctional imide oligomer was chain extended by adding 1.7500 g BPDA (0.00595 moles), 1.2542 g ODA (0.00626 moles) and 15 ml NMP to the transferred solution. The reaction was allowed to proceed at room temperature for three hours during which time the solution became very viscous. Films cast from the reaction solution and imidized thermally in a forced air convection oven were clear and creasable. DSC measurements detected the presence of two reproducible Tg's occurring at 195° C. and 260° C.

EXAMPLE 5

Comparative 6FDA/APB-133/BPDA/4,4'-ODA polymer synthetic procedure

A 250 ml round bottom flask was fitted with an overhead stirrer assembly, nitrogen inlet and a thermocouple. The diamine APB-133 (2.2764 g) was added to the flask and dissolved in approximately 20 ml NMP. The solution was then cooled to 10° C. using an ice bath. The dianhydride 6FDA (3.7236 g) was then added to the solution as a solid and washed in with 5 cc's DMAC. The monomers were allowed to react for three hours at 10° C., and three hours at room temperature. After this, 2.5084 g ODA, 3.5000 g BPDA and 23 ml NMP were added to the system. The solution was then stirred for another hour at 10° C., followed by three hours at room temperature. A portion of the segmented amic acid polymer solution was then cast onto a clean glass plate and thermally imidized in a forced air convection oven. The resulting polyimide film exhibited a single reproducible Tg occurring at 245° C., indicating that considerable exchange of components (diamines and dianhydrides) between the two segments had occurred.

EXAMPLE 6

Preparation of 6FDA/APB-133-b-PMDA/PPD segmented copolymer (60 wt. % 6FDA/APB-133)

A portion of the oligomeric imide solution prepared in Example 3 (18.2 g 0.000315 moles polyimide) was transferred to a three neck 250 round bottom flask. The flask was fitted with an overhead stirrer assembly, Nitrogen inlet and thermocouple. The solution was then cooled to 10° C. using an ice bath. The soluble difunctional polyimide oligomer was chain extended by adding 1.31 g PMDA, 0.6836 g PPD and 16 ml NMP to the cooled solution. The polymerization was allowed to proceed for 3 hours at 10° C. and three hours at room temperature. A portion of the resulting viscous copolymer solution was cast onto a glass plate and thermally imidized to yield a clear creasable film.

EXAMPLE 7

Comparative 6FDA/APB-133/PMDA/PPD random (unsegmented) polymer preparation

A 250 ml round bottom flask was fitted with an overhead stirrer assembly, nitrogen inlet and a thermocouple. The diamines APB-133 (1.1967 g) and PPD (0.6836 g) were added to the flask and dissolved in approximately 25 ml NMP. The solution was then cooled to 10° C. using an ice bath. To this solution was added 1.31 g PMDA, 1.9576 g 6FDA and 7 ml NMP. The polymerization was allowed to proceed at 10° C. for three hours and at room temperature for a further three hours. A portion of the resulting viscous random copolymer solution was cast onto a glass plate and thermally imidized to yield a clear creasable film.

EXAMPLE 8

Preparation of 6FDA/4,4'-ODA-PMDA/APB-133 segmented polymer (50 wt. % 6FDA/4,4'-ODA)

A portion of the solution prepared in Example 1 (20.9 g, 0.0010 moles polyimide) was transferred to a three neck 250 ml round bottom flask. The flask was fitted with an overhead stirrer assembly and a nitrogen inlet. The soluble imide oligomer was chain extended by adding 1.5900 g PMDA (0.0073 moles), 2.4176 g APB-133 (0.0083 moles) and 15 ml NMP to the solution. The polymerization was allowed to proceed at room temperature for three hours to prepare the imide/amic acid segmented polymer. A portion of the solution was cast onto a glass plate and thermally imidized to yield a clear creasable film. Another portion of the solution was diluted with CHP and heated at 180° C. for 3 hours to fully imidize the segmented imide/amic acid polymer into an imide/imide segmented copolymer. The fully imidized copolymer remained in solution, and it was isolated by pouring the solution into excess water. After vacuum drying, the copolymer was compression molded at 300° C. for 25 minutes to yield a homogeneous clear creasable film.

EXAMPLE 9

Preparation of 6FDA/4,4'-ODA-b-PMDA/PPD segmented polymer (75 wt % 6FDA/4,4'-ODA)

A portion of the solution prepared in Example 1 (26.13 g, 0.0012 moles polyimide) was transferred to a three neck 250 ml round bottom flask. The flask was fitted with an overhead stirrer assembly, nitrogen inlet and a thermocouple. The solution was then cooled to 10° C. using an ice bath. The soluble imide oligomer was reacted further by adding 1.0200 g PMDA (0.0047 moles), 0.6391 g PPD (0.0059 moles) and 10 cc's NMP to the cooled solution. The polymerization was allowed to proceed at 10° C. for three hours and then at room temperature for a further three hours. Films cast from the viscous copolymer solution and thermally imidized were clear and creasable.

A sample of the imide/amic acid segmented polymer was pressure filtered through a 1 micron filter, spin coated onto a silicon wafer and cured at 135° C. for 30 min, 250° C. for 30 min and then 325° C. for 2 hours. The oxide layer on the wafer was removed via aqueous HF etch to give the free film (11.1 micron) which yielded the following mechanical properties on an Instron Model 4501 (ASTM D 882-83 (Method A)). Tensile strength (peak) = 140 MPa, Tens. Str. at break = 139

MPa, Elongation at break=42%, and Young's Modulus=2.4 GPa. Comparison to a similarity prepared film of 6FDA/ODA homopolymer (22.8 micrometers, Tens. Str. (peak)=117, Tens. Str. at break=116, Elongation at break=37 and Young's modulus=1.9 GPa) indicates that a significant increase in modulus and modest increase in strength were realized for the segmented copolymer.

EXAMPLE 10

Demonstration of the Fact that no Reaction takes place between External Amines and the Polyimide Segment at Room Temperature Into a 100 ml reaction kettle fitted with a four neck kettle top which was equipped with a mechanical stirrer and nitrogen inlet and outlet, were charged 8.0000 g (1.34574×10E-2 moles) of 2,2-(bis(N,N'-diphenylphthalimide) hexafluoropropane along with 52 ml of N-methylpyrrolidinone and 13 ml of N-cyclohexylpyrrolidinone. Since the material dissolved slowly at room temperature, the kettle was heated to 60° C. for approx. 15 min to completely dissolve the imide.

After cooling to room temperature, 4.9854 g (2.69147×10E-2 moles) of 4-phenoxyaniline was added to the solution and the mixture was allowed to stir overnight under nitrogen (approx. 16 hours). A homogeneous solution resulted after the overnight reaction, but upon standing a small amount of solid precipitated from the solution. This precipitate readily redissolved upon slight warming of the solution. Samples of the reaction mixture along with the starting materials were analyzed by high performance liquid chromatography. The reaction solution exhibited only two peaks corresponding to the starting materials. No peaks attributable to exchange or rearrangement between amine and imide were evidenced proving that exchange or rearrangement is not occurring between amine and imide functions during the synthetic procedure to form the imide/amic acid segmented polymers. After standing for several weeks, the samples developed at least one extra peak, which might be attributed to oxidation of the amine, or other reasons unclear to the applicants. The word "rearrangement" in this discussion implies also the meaning of "exchange". Thus, rearrangement between different segments means exchange between segments, equally well as rearrangement within one segment.

What is claimed is:

1. A method of making a polyimide copolymer precursor containing a first segment and a second segment, comprising the steps of:
    (a) reacting a first acid dianhydride with a first diamine in a molecular ratio to obtain a first amic acid segment having two identical terminal portions selected from the group consisting of acid anhydride and amine;
    (b) imidizing the first amic acid segment to form the first segment to a degree which prevents amine and anhydride rearrangment
        (1) within the first segment, and
        (2) between the first and the second segment; and
    (c) reacting the first segment with a second acid dianhydride and a second diamine to form a second segment attached to the first segment through an amide group having a carbon-nitrogen bond.
2. The method as defined in claim 1 wherein the precursor is soluble in a polar solvent selected from the group consisting of sulfoxides, formamides, acetamides, pyrrolidones, phenolics, lactones and mixtures thereof.
3. The method as defined in claim 2 wherein steps (a) through (c) are carried out in said polar solvent
4. The method as defined in claim 3 wherein the solvent is selected from the group consisting of N-methyl-2-pyrrolidone, N-cyclohexyl-2-pyrrolidone, N-vinyl-2-pyrrolidone, and mixtures thereof.
5. The method as defined in claim 1 wherein said first amic acid segment has identical acid anhydride terminal portions and wherein the carbon of the amide group is part of the first segment and the nitrogen of the amide group is part of the second segment.
6. The method as defined in claim 1 wherein said first amic acid segment has identical amine terminal portions and wherein the nitrogen of the amide group is part of the first segment and the carbon of the amide group is part of the second segment.
7. The method as defined in claim 1 wherein the second segment, if fully imidized in the absence of the first segment, becomes immiscible with the first segment.
8. The method as defined in claim 1 wherein the first diamine is different from the second diamine and the first dianhydride is different from the second dianhydride.
9. The method as defined in claim 1, wherein the weight content of the second segment is higher than the weight content of the first segment in the precursor.
10. A method of making a polyimide copolymer having a first imide segment and a second imide segment, comprising the steps of:
    (a) reacting a first acid dianhydride with a first diamine in a molecular ratio to obtain a first amic acid segment having two identical terminal portions selected from the group consisting of acid anhydrides and amines;
    (b) imidizing the first amic acid segment to form the first imide segment to a degree which prevents amine and anhydride rearrangement
        (1) within the first imide segment, and
        (2) between the first imide and a second amic acid segment; and
    (c) reacting the first imide segment with a second acid dianhydride and a second diamine to form a second amic acid segment attached to the first imide segment through am amide group having a carbon-nitrogen bond,
    (d) imidizing the second amic acid segment to form the second imide segment of the polyimide copolymer.
11. A method of method of making a polyimide copolymer as defined in claim 10, wherein the polyimide copolymer is insoluble in at least one polar solvent.
12. A method as defined in claim 11, wherein the polyimide is insoluble in the following polar solvents: sulfoxides, formamides, acetamides, pyrrolidones, phenolics, lactones and mixtures thereof.
13. A method as defined in claim 10 wherein the first diamine differs from the second diamine and the first dianhydride differs from the second dianhydride.
14. A method as defined in claim 10 wherein the weight content of the second imide segment is higher than the weight content of the first imide segment.

* * * * *